United States Patent [19]

Easton

[11] 4,066,164
[45] Jan. 3, 1978

[54] FEEDING MECHANISM FOR GRANULAR MATERIAL

[76] Inventor: Harlan J. Easton, R.F.D. No. 3, Blooming Prairie, Minn. 55917

[21] Appl. No.: 642,578

[22] Filed: Dec. 19, 1975

[51] Int. Cl.² .............................................. B65G 47/18
[52] U.S. Cl. ................................... 198/616; 198/575; 198/611; 214/17 DA; 222/228; 64/15 C
[58] Field of Search .............. 198/733, 729, 727, 734, 198/611, 616, 575, 576, 612; 214/17 A, 17 D, 17 DA; 222/228, 241, 239; 64/15 C; 119/52 AF

[56] References Cited

U.S. PATENT DOCUMENTS

| | | | |
|---|---|---|---|
| 509,488 | 11/1893 | Potter | 222/239 |
| 1,150,483 | 8/1915 | Barber | 64/15 C |
| 2,233,085 | 2/1941 | Schweickart | 214/17 DA |
| 2,595,941 | 5/1952 | Hapman | 198/733 |
| 3,067,914 | 12/1962 | Ellaby | 214/17 DA |
| 3,088,606 | 5/1963 | Schaefer | 214/17 DA |
| 3,138,300 | 6/1964 | Rintala | 214/17 D |
| 3,272,400 | 9/1966 | Van Huis | 119/52 AF |
| 3,339,759 | 9/1967 | Wellons | 214/17 DA |
| 3,555,997 | 1/1971 | van der Lely | 214/17 DA |

Primary Examiner—Robert J. Spar
Assistant Examiner—Lawrence E. Williams
Attorney, Agent, or Firm—Merchant, Gould, Smith, Edell, Welter & Schmidt

[57] ABSTRACT

Apparatus for discharging granular material from a bulk container tapering at its bottom, including a conveyor and a discharge chamber at the bottom of the bulk container. The discharge chamber includes an impeller rotated by a vertical shaft extending through the bottom of the chamber, and a traveler shaft connected at one end to the vertical shaft, by a coil spring knuckle-joint, and carrying at its other end a contactor which rides on the inner surface of the tapering bottom, the shaft being provided with projecting cross pins to move in the material and break up agglomerations and bridges. Power means are provided for driving the vertical shaft and the conveyor, either separately or serially, and the opening between the chamber and the conveyor is adjustable to vary the flow of material. The conveyor comprises a plurality of flights secured to an endless cable, which moves for at least a part of its travel through a tube leading from the discharge chamber to an area of discharge for the material.

2 Claims, 9 Drawing Figures

U.S. Patent   Jan. 3, 1978   Sheet 1 of 2   4,066,164
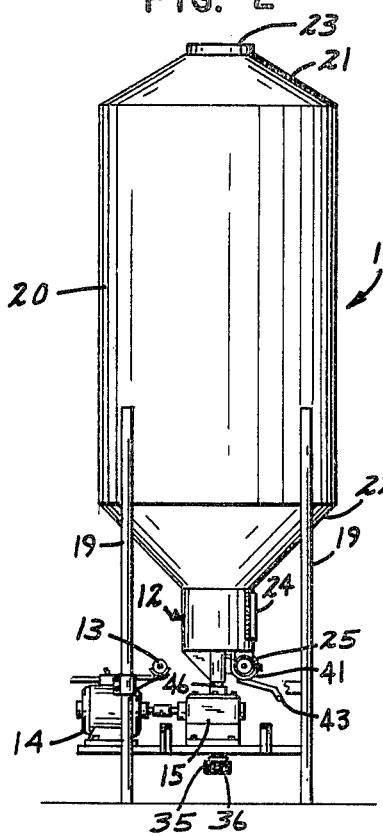
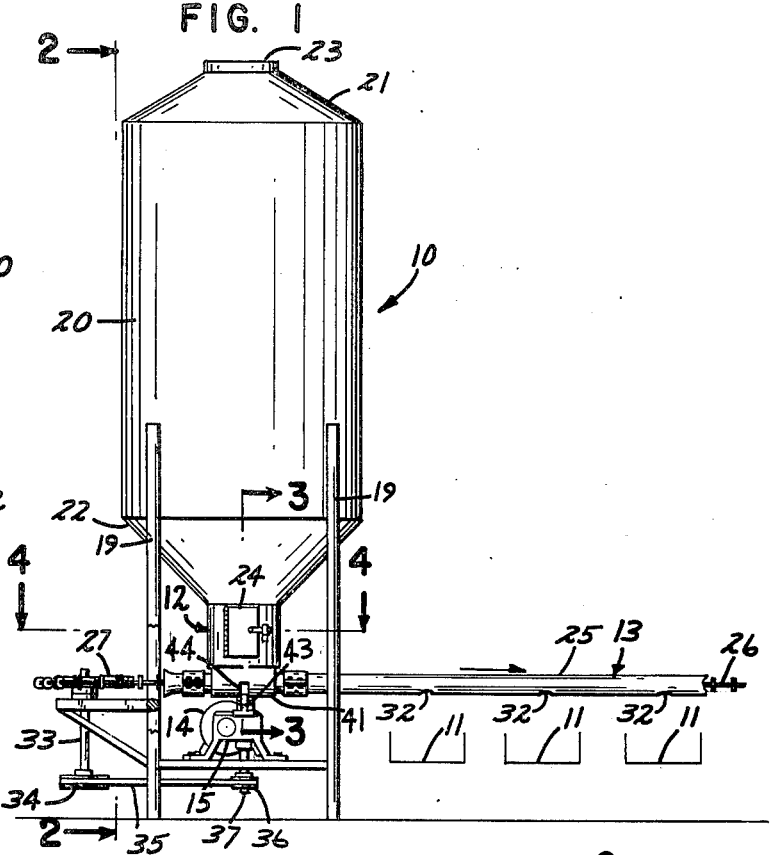
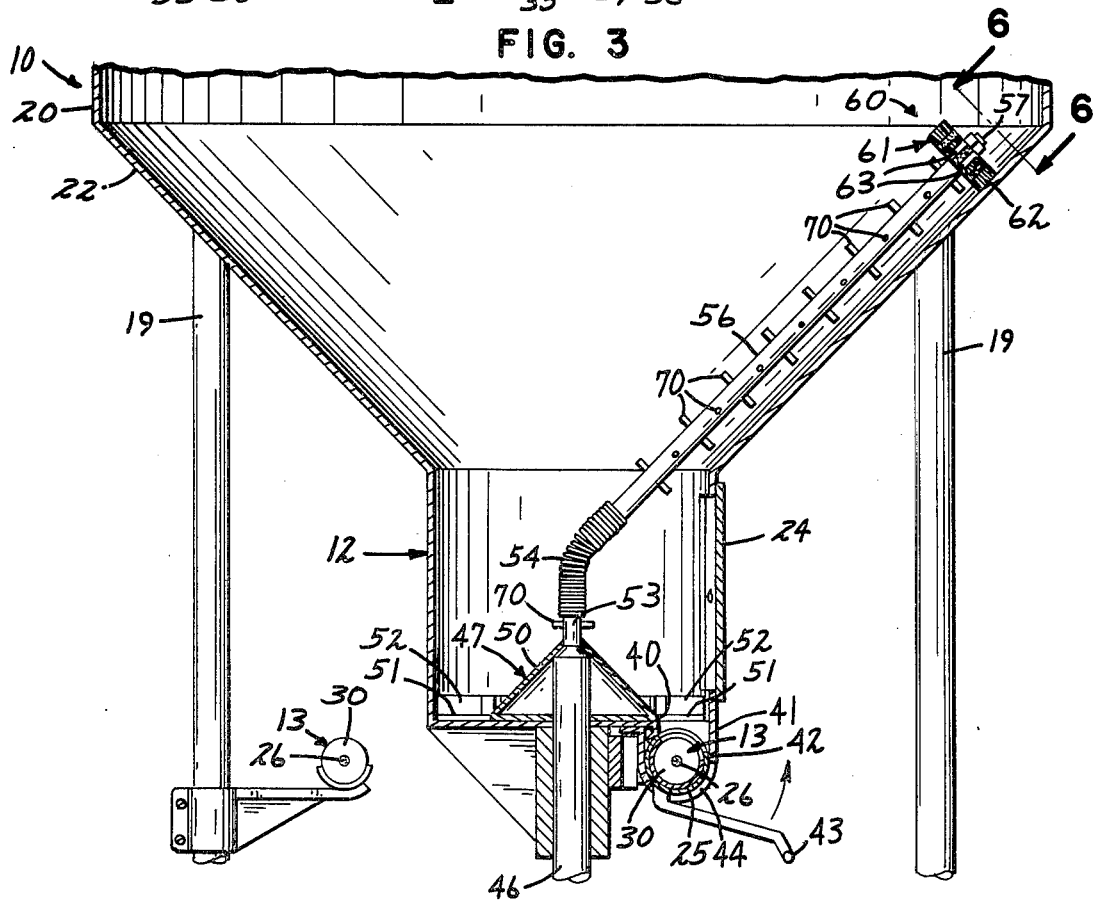

FEEDING MECHANISM FOR GRANULAR MATERIAL

BACKGROUND OF THE INVENTION

This invention relates to the general field of materials handling, and more particularly to apparatus for distributing granular material such as animal feed from a bulk storage container to one or several locations of use. It is traditional to store such material at an elevated location and rely heavily on gravity to assist in the distribution of the material, but the well known tendency of such materials to agglomerate into clumps often of considerable size, and to bridge across open spaces, makes pure gravity feed unreliable.

SUMMARY OF THE INVENTION

The present invention comprises an arrangement whereby granular material in a bulk storage container is reliably distributed therefrom to one or more locations of use by means including both a vertical feed and a horizontal feed, the latter by a cable conveyor and the former including a special arrangement for breaking clumps and preventing bridging.

Various characteristics and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing,

FIG. 1 is a front view of apparatus according to the invention;

FIG. 2 is a sectional view of the apparatus as seen from the line 2—2 of FIG. 1;

FIG. 3 is an enlarged sectional view long the line 3—3 of FIG. 1;

DESCRIPTION OF THE PREFERRED EMBODIMENT

Figure 4:
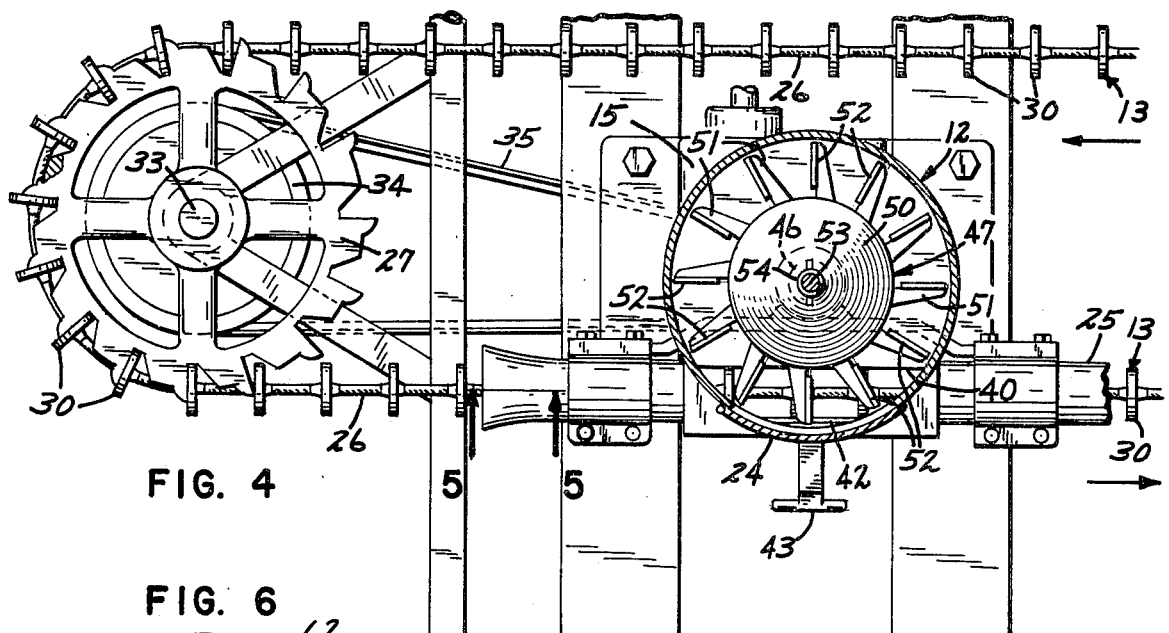
FIG. 4 is an enlarged sectional view along the line 4—4 of FIG. 1.

FIGS. 1 and 2 show a system for distributing granular material such as animal feed from a bulk storage container 10 to a plurality of utilization areas such as individual troughs 11. The system includes a discharge chamber 12 and a cable conveyor 13, and is actuated by a motor 14 through a gear box 15.

Container 10 is mounted on a plurality of legs 19, and comprises a cylinder 20 having a vertical axis and substantially closed at its ends by outwardly convex conical caps 21 and 22. Upper cap 21 has a central filler opening closeable by a cover 23. Lower cap 22 joins chamber 12, which is provided with an access door 24.

Figure 5:
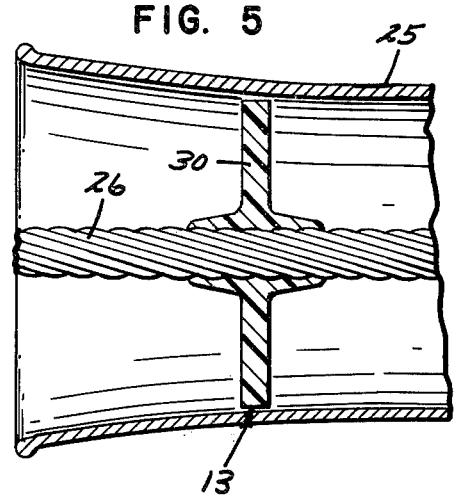
FIG. 5 is a fragmentary sectional view, on a still larger scale, along the line 5—5 of FIG. 4.

Conveyor 13 comprises a tube 25 extending horizontally, a cable 26 passing around a pair of wheels having vertical axes, one of which is shown at 27, and a plurality of flights 30 compressively or otherwise secured to the cable centrally as best shown in FIG. 5. For a portion of its length, cable 26 passes through tube 25, which is provided with openings 32 at the locations of troughs 11. Cable 26 is driven through wheel 27, a shaft 33, a pulley 34, a belt 35, and a second pulley 36 from a shaft 37 extending downwardly from gear box 15. The direction of motion of cable 26 is as shown by the arrows in FIG. 4. The end of tube 31 at which flights 30 enter the tube is belled as at 39 to facilitate the entry process. An auxiliary support trough 39 may be supplied if desired.

Figure 6:
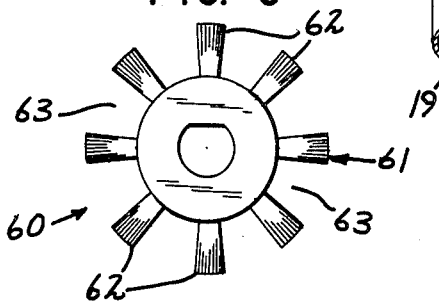
FIG. 6 is an elevational view of a portion of the invention as viewed from the line 6—6 of FIG. 3.
Figure 7:
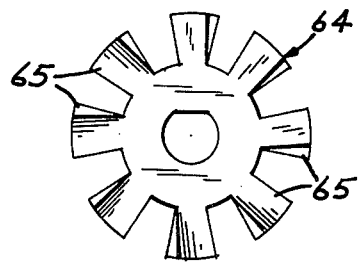
FIG. 7 is a view similar to FIG. 6 showing an alternate embodiment.
Figure 8:
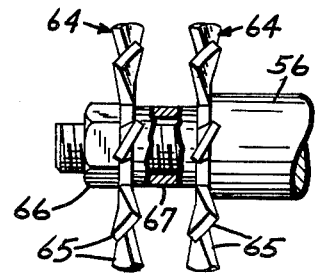
FIG. 8 is an elevational view illustrating the method of mounting the structure of FIG. 7, portions thereof being broken away and shown in section.

Chamber 12 is centrally located at the bottom of container 10, and tube 25 is located directly below chamber 12. A portion of the bottom of chamber 12 is cut away as at 40, and an adjacent portion of the tube 25 is also cut away to provide a passage for material from chamber 12 to tube 25. A fairing piece 41 extends downward from chamber 12 to complete the enclosure, and includes a cylindrical shutter 42 actuable by a handle 43 extending through a slot 44 in fairing piece 41. Operation of shutter 42 widens or narrows the opening from chamber 12 to tube 25, and thus varies the rate of passage of granular material. A shaft 46 extends upwardly from gear box 15 into chamber 12, and to it is secured an impeller 47 having a central, upwardly convex conical surface 50 surrounded by a plurality of spaced radial blades 51 having vertically extending lips 52. Shaft 46 is reduced in diameter at its upper end 53 and is coupled by a knuckle-joint 54 in the form of a coil spring to a traveler shaft 56. The outer end 57 of the traveler shaft carries a contacting element 60 which peripherally engages the conical bottom 22 of container 10 internally. It will be apparent that as shaft 46 rotates, the resulting rotation of traveler shaft 56 has a component of rotation about its own axis, and can have a component of revolution about the axis or shaft 46 to define a conical surface coaxial with element 22. A highly satisfactory form for contacting element 60, as shown in FIG. 6, is that of a circular brush 61 having sections of its bristles 62 removed as at 63. An alternate form is shown in FIGS. 7 and 8 to comprise a pair of discs 64 of sheet metal having spokes 65 twisted out of the planes of the discs, and secured to shaft 56 by means including a nut 66 and a spacer 67.

Shafts 46 and 56 are provided with a series of projecting cross pins 70, by the aid of which agglomerations and bridging in container 10 are alleviated. It will be apparent that if container 10 is filled with granular material and motor 14 is not moving, a small amount of the material runs through the apertures in chamber 12 and tube 25 to fill the spaces between flights 30 of the conveyor in that portion of the tube.

When a supply of material is desired at troughs 11, motor 14 is started, and cable 26 moves flights 30 through tube 25, drawing with them material dropping through the openings from the bottom of chamber 12. The amount of material passing in a unit of time is determined by the setting of handle 43. As long as the material is unagglomerated and free flowing, rotation of shaft 46 simply causes impeller 47 to stir the material in chamber 12 and the movement of shaft 56 is principally rotation about its own axis, accompanied by a slow rate of revolution of the traveler shaft about the axis of shaft 46. This stirs and agitates the material above the knuckle-joint 55 and near cap 22 and breaks up any agglomerations of the material in that volume to keep it in free flowing condition. As material is discharged through opening 40, the material in container 10 slowly settles, moving through the path of traveler shaft 56 which prevents bridging in the portions 12 and 22 of the container. The diameter of cylinder 20 itself is usually so large that bridging of the whole diameter thereof seldom occurs.

Openings 32 are so arranged, by size or location for example, that material moving in tube 25 is not all discharged at the first trough 11, but some is carried past for deposit in subsequent troughs.

Figure 9:
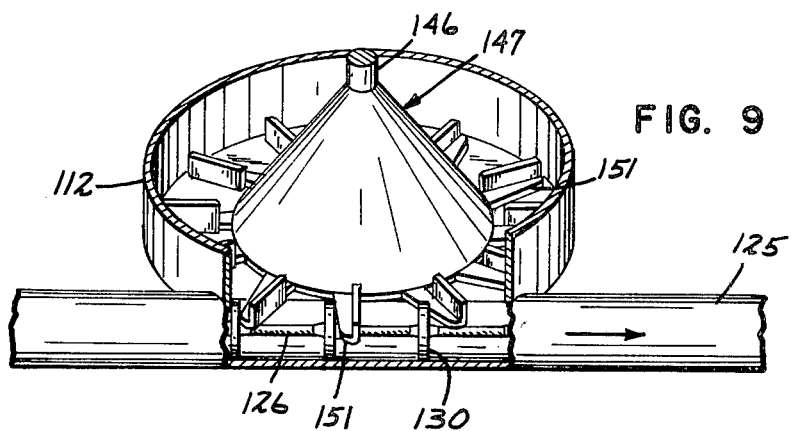
FIG. 9 is an isometric fragmentary sectional view showing a modification of the invention.

FIG. 9 shows a modified embodiment of the invention in which shaft 46 of FIG. 2 is not connected to gear box 15. In this embodiment, the axis of tube 125 is raised so that blades 151 of the impeller do not pass above the flights 130, but interdigitate with them in a form of chain and sprocket arrangement. Now when cable 126 is driven by a suitable power source, flights 130 engage impeller 147 to cause rotation thereof. In other respects this embodiment has the same characteristics as that first described, and function in the same fashion.

From the above it will be evident that I have invented a new and useful arrangement for feeding granular material from a bulk container, by which the problems of agglomeration of the material and bridging as it settles in the conical bottom of the container are substantially eliminated.

Numerous characteristics and advantages of my invention have been set forth in in the foregoing description, together with details of the structure and function of the invention, and the novel features thereof are pointed out in the appended claims. The disclosure, however, is illustrative only, and changes may be made in detail, especially in matters of shape, size, and arrangement of parts, with the principle of the invention, to the full extent indicated by the broad general meaning of the terms in which the appended claims are expressed.

What is claimed is:

1. In combination:

A conveyor comprising a cable, a plurality of circular flights secured to said cable at spaced intervals therealong, a tube, having an inside diameter substantially the same as the diameter of said flights, through which said cable passes, and driving and idler wheels for said cable spaced beyond the ends of said tube;

a bulk container for granular material having an upwardly concave, generally conical bottom and a central discharge chamber of reduced size located below and opening into said bottom and including a peripheral discharge orifice of limited area opening downwardly into said tube;

a feed mechanism including a vertical central shaft passing upward to terminate within said chamber, an impeller carried by said shaft and including a plurality of peripherally located spaced radial blades for displacing material in said chamber to said peripheral opening for discharge therethrough, an upwardly convex conical center for guiding loose material in said chamber outwardly to the blades of said impeller, and means actuated by said drive shaft for preventing bridging and agglomeration of said material in said chamber;

a source of driving power;

and means connecting said source to actuate said conveyor, the linear spacing of said flights on said cable being an integral multiple of the peripheral spacing of said blades around said impeller, and said blades projecting partially through said discharge orifice to engage said flights and drive said impeller from the conveyor.

2. Apparatus according to claim 1 in which said tube is apertured at spaced locations therealong to permit downward discharge of granular material therethrough, the discharge apertures in said tube being so positioned and sized that only part of the material transported by said conveyor is discharged at one of said apertures.

* * * * *